(12) United States Patent
Casebolt et al.

(10) Patent No.: US 9,707,421 B2
(45) Date of Patent: Jul. 18, 2017

(54) ENERGY ABSORBER COVER

(71) Applicant: D B Industries, LLC, Red Wing, MN (US)

(72) Inventors: Scott C. Casebolt, St. Paul Park, MN (US); J. Thomas Wolner, Red Wing, MN (US)

(73) Assignee: D B Industries, LLC, Red Wing, MN (US)

(*) Notice: Subject to any disclaimer, the term of this patent is extended or adjusted under 35 U.S.C. 154(b) by 8 days.

(21) Appl. No.: 13/827,309

(22) Filed: Mar. 14, 2013

(65) Prior Publication Data
US 2014/0224581 A1 Aug. 14, 2014

Related U.S. Application Data

(60) Provisional application No. 61/762,482, filed on Feb. 8, 2013.

(51) Int. Cl.
*A62B 35/04* (2006.01)
*F16F 7/00* (2006.01)
(Continued)

(52) U.S. Cl.
CPC .......... *A62B 35/04* (2013.01); *A62B 35/0025* (2013.01); *A62B 35/0037* (2013.01);
(Continued)

(58) Field of Classification Search
CPC ............ A62B 35/0093; A62B 35/0037; A62B 35/0025; A62B 35/0006; A62B 35/00; A62B 35/04
(Continued)

(56) References Cited

U.S. PATENT DOCUMENTS 4,526,298 A 7/1985 Boxer et al.
4,877,110 A * 10/1989 Wolner .............. A62B 35/0093
182/18
(Continued)

OTHER PUBLICATIONS

DBI SALA's Harness Hydration System 1150174, DBI-SALA Products, http://www.capitalsafety.com, 2 pages (printed Jun. 12, 2007).
(Continued)

*Primary Examiner* — Daniel Cahn
*Assistant Examiner* — Shiref Mekhaeil
(74) *Attorney, Agent, or Firm* — Dicke, Billig & Czaja, PLLC

(57) ABSTRACT

A cover for an energy absorber comprises front and rear sides having first and second legs extending downward forming an upside down V-shape. The front and rear sides define a cavity therebetween and an opening provides access to the cavity proximate a top portion of the front side and a top of the rear side. The top portion is configured and arranged to engage a connector. The top portion includes a first portion of a fastener, and the top includes a second portion of the fastener. The first and second portions releasably interconnect the top portion and the top. A first strap is operatively connected to the first leg and is configured and arranged to engage a first shoulder strap of the safety harness. A second strap is operatively connected to the second leg and is configured and arranged to engage a second shoulder strap of the safety harness.

15 Claims, 18 Drawing Sheets

(51) Int. Cl.
*A62B 35/00* (2006.01)
*F16C 11/04* (2006.01)
*F16B 45/04* (2006.01)

(52) U.S. Cl.
CPC .......... *A62B 35/0075* (2013.01); *F16B 45/04* (2013.01); *F16C 11/04* (2013.01); *F16F 7/006* (2013.01); *Y10T 403/32041* (2015.01)

(58) Field of Classification Search
USPC ................................................ 182/3, 5, 231
See application file for complete search history.

(56) References Cited

U.S. PATENT DOCUMENTS

| | | | |
|---|---|---|---|
| 5,090,503 A * | 2/1992 | Bell | 182/5 |
| 5,279,386 A * | 1/1994 | Cearley | 182/3 |
| 5,329,884 A | 7/1994 | Bell | |
| 5,358,142 A | 10/1994 | Holmes | |
| 5,788,134 A | 8/1998 | Matic, Jr. | |
| 6,085,947 A | 7/2000 | Lien | |
| 6,253,874 B1 | 7/2001 | Casebolt et al. | |
| 6,497,348 B2 | 12/2002 | Forsman et al. | |
| 6,533,066 B1 * | 3/2003 | O'Dell | 182/3 |
| 6,675,998 B2 | 1/2004 | Forsman et al. | |
| 6,971,476 B2 * | 12/2005 | Wolner et al. | 182/3 |
| 7,946,387 B2 * | 5/2011 | Betcher et al. | 182/231 |
| 8,292,028 B2 * | 10/2012 | Wise | 182/3 |
| 8,584,799 B1 * | 11/2013 | Dennington | 182/3 |
| 8,651,235 B2 * | 2/2014 | Wood | 182/5 |
| 8,678,134 B2 * | 3/2014 | Wood | 182/5 |
| 8,746,739 B2 * | 6/2014 | Meggs et al. | 280/748 |
| 2004/0031834 A1 | 2/2004 | Barr | |
| 2005/0082114 A1 * | 4/2005 | Casebolt et al. | 182/3 |
| 2005/0269153 A1 * | 12/2005 | Casebolt | 182/3 |
| 2006/0048723 A1 * | 3/2006 | Rohlf et al. | 119/857 |
| 2006/0113147 A1 * | 6/2006 | Harris, Jr. | 182/3 |
| 2006/0243765 A1 | 11/2006 | Valeriana | |
| 2007/0181616 A9 | 8/2007 | Horito et al. | |
| 2007/0209868 A1 * | 9/2007 | Betcher et al. | 182/3 |
| 2008/0035423 A1 * | 2/2008 | Meillet | A62B 35/0056 182/3 |
| 2008/0156839 A1 * | 7/2008 | Betcher et al. | 224/630 |
| 2009/0078505 A1 * | 3/2009 | Casebolt | A62B 35/0093 182/231 |
| 2009/0084631 A1 * | 4/2009 | Casebolt | A62B 1/10 182/235 |
| 2009/0173578 A1 * | 7/2009 | Renton | A62B 1/08 182/235 |
| 2010/0025157 A1 * | 2/2010 | Casebolt | 182/231 |
| 2010/0078262 A1 * | 4/2010 | Townend | A62B 35/0062 182/36 |
| 2010/0163338 A1 * | 7/2010 | Wood | 182/6 |
| 2010/0224448 A1 * | 9/2010 | Wolner | A62B 1/10 182/234 |
| 2010/0226748 A1 * | 9/2010 | Wolner | A62B 35/0093 414/815 |
| 2011/0084158 A1 * | 4/2011 | Meillet | A62B 1/08 242/385.4 |
| 2011/0100766 A1 * | 5/2011 | Auston | A62B 35/0093 188/65.1 |
| 2011/0297778 A1 * | 12/2011 | Meillet | B66D 1/34 242/376 |
| 2012/0205478 A1 * | 8/2012 | Balquist et al. | 242/379.1 |
| 2013/0008742 A1 * | 1/2013 | Schurian | A62B 35/0031 182/3 |
| 2013/0104351 A1 * | 5/2013 | Casebolt | A62B 35/0037 24/522 |
| 2013/0104374 A1 * | 5/2013 | Schlangen et al. | 29/525.01 |
| 2013/0105247 A1 * | 5/2013 | Casebolt | A62B 1/10 182/241 |
| 2014/0224580 A1 * | 8/2014 | Casebolt | A62B 35/0025 182/3 |

OTHER PUBLICATIONS

DBI SALA User Instruction Manual Harness Hydration System, Form No. 5902394, Rev. A, 2 pages (printed Jun. 12, 2007).
DBI SALA Hydration System for Full Body Harness—Compact Hydration System Connects to Any DBI-SALA Harness and Holds 50 Ounces of Liquid for Added Worker Safety and Productivity, 2 pages (printed Jun. 12, 2007).
"High Sierra 1.5-Liter Reservoir", High Sierra Sport Company, http://www.highsierrasport.com, 3 pages (Printed Dec. 28, 2006).
"Fall Protection Harnesses & Lanyards", RTC Fall Protection Products, http://www.fallprotection.com, 1 page (Printed Dec. 14, 2006).
"Edge Series Harness Features", Guardian Fall Protection, pp. 56-57 (Printed from 2006 on-line catalog).
"Edge Series Harness Accessories", Guardian Fall Protection, http://www.guardianfall.com, 1 page (Printed Dec. 14, 2006).
"HYDRATOR™ ", RTC® Fall Protection, 1 page.

* cited by examiner

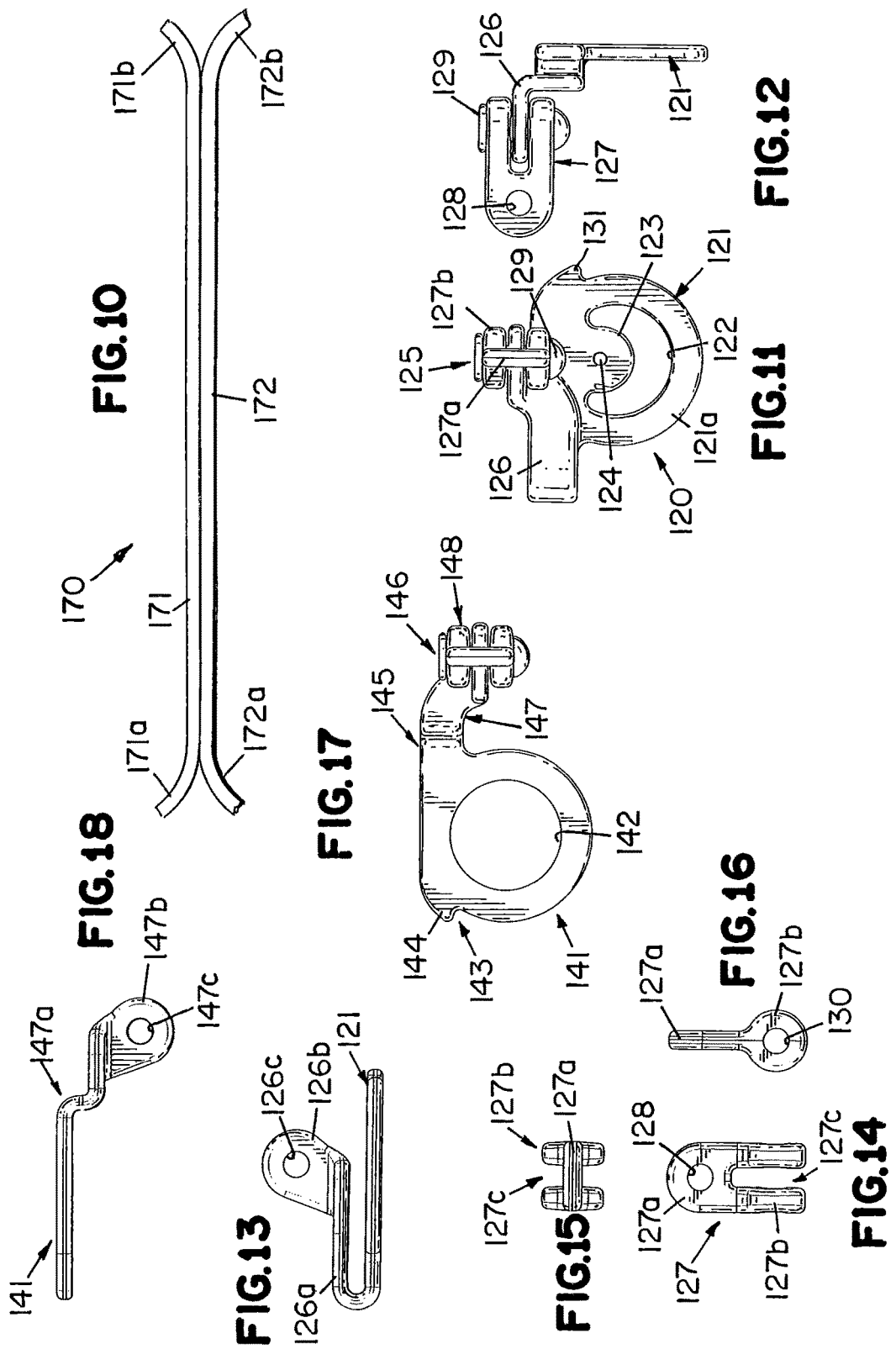

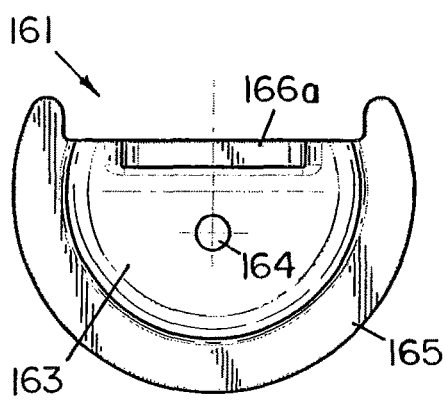
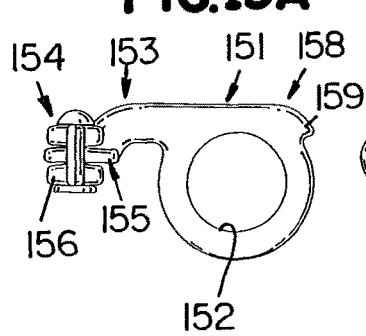
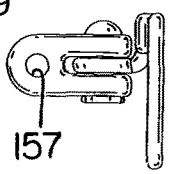
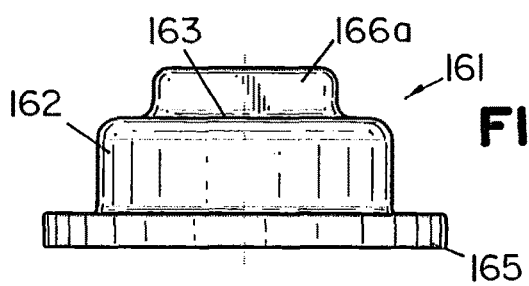
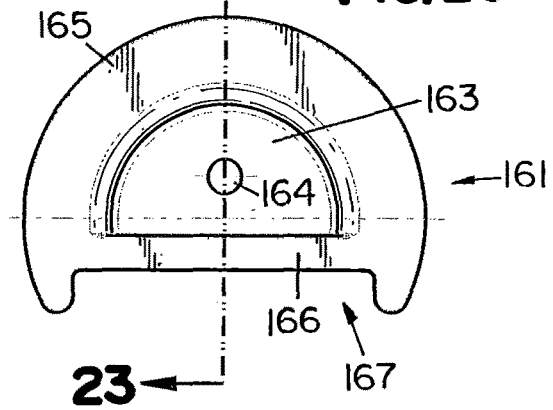
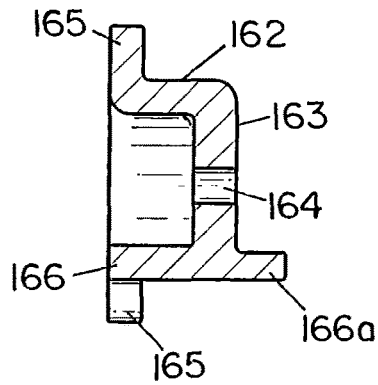
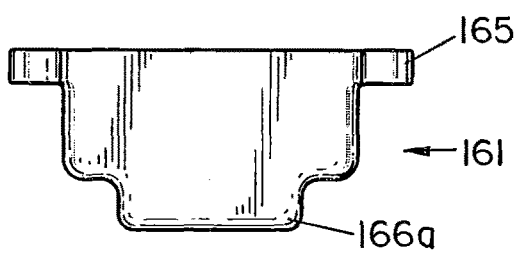
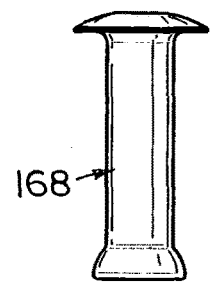

ENERGY ABSORBER COVER

BACKGROUND OF THE INVENTION

To protect workers who work at heights or are at risk of falling distances, lifelines interconnecting support structures and safety harnesses donned by workers are commonly used. Examples of lifelines include but are not limited to self-retracting lifelines, lanyards, and other suitable lifelines. If a fall event occurs, the lifeline limits the distance the worker could fall, however, injury to the worker could still occur if, for example, the fall distance before the lifeline becomes taut is significant. Energy absorbers are typically used in conjunction with such fall arrest equipment to provide a more gradual, less abrupt stop, which assists in preventing or reducing injuries because energy absorbers absorb some of the kinetic energy of the falling body.

Energy absorbers could interfere with the operation of such fall arrest equipment, especially if they are relatively large and/or are in positions where they could easily become tangled with the lifelines, safety harnesses, etc. Therefore, the present invention addresses such problems because the energy absorber cover assists in maintaining the energy absorber in a relatively compact configuration to reduce the risk of the energy absorber interfering with other components of the fall arrest equipment.

For the reasons stated above and for other reasons stated below, which will become apparent to those skilled in the art upon reading and understanding the present specification, there is a need in the art for an energy absorber cover.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a cover for an energy absorber operatively connected to a safety harness comprises front and rear sides and first and second connecting members. The front and rear sides are operatively connected to form first and second legs extending downward in an upside down V-shape. The front side has a top portion including a first portion of a fastener, and the rear side has a top including a second portion of the fastener. The front and rear sides form an opening proximate the top, and the opening provides access to a cavity formed between the front and rear sides. The first and second connecting members are proximate distal ends of the first and second legs. The first connecting member operatively connects the first leg to a first strap of the safety harness, and the second connecting member operatively connects the second leg to a second strap of the safety harness.

In one embodiment, a cover for an energy absorber operatively connected to a safety harness comprises a front side, a rear side, a first strap, and a second strap. The front side has a first leg and a second leg extending downward from a top portion. The first leg and the second leg form an upside down V-shape. The top portion includes a first portion of a fastener. The rear side has a third leg and a fourth leg extending downward from a top. The third leg and the fourth leg form another upside down V-shape. The rear side is operatively connected to the front side, and the rear side and the front side define a cavity therebetween. An opening provides access to the cavity proximate the top of the rear side. The top includes a second portion of the fastener, and the first and second portions of the fastener releasably interconnect the top portion of the front side and the top of the rear side. The first strap is operatively connected to the first leg and is configured and arranged to engage a first shoulder strap of the safety harness. The second strap is operatively connected to the second leg and is configured and arranged to engage a second shoulder strap of the safety harness.

BRIEF DESCRIPTION OF THE DRAWINGS

The present invention can be more easily understood, and further advantages and uses thereof can be more readily apparent, when considered in view of the detailed description and the following Figures in which:

FIG. 10 is a schematic view of an energy absorber component of an energy absorber assembly constructed in accordance with the present invention;

FIG. 11 is a front view of a bracket assembly component of an energy absorber assembly constructed in accordance with the present invention;

FIG. 12 is a side view of the bracket assembly shown in FIG. 11;

FIG. 13 is a bottom view of base of the bracket assembly shown in FIG. 11;

FIG. 14 is a side view of a swivel portion of the bracket assembly shown in FIG. 11;

FIG. 15 is a front view of the swivel portion shown in FIG. 14;

FIG. 16 is a side view of the swivel portion rotated 90 degrees from that shown in FIG. 14;

FIG. 17 is a front view of a first base of another embodiment bracket assembly component of an energy absorber assembly constructed in accordance with the present invention;

FIG. 18 is a top view of the first base shown in FIG. 17;

FIG. 19A is a front view of a second base used with the first base shown in FIG. 17;

FIG. 19B is a side view of the second base shown in FIG. 19A;

FIG. 20 is a front view of a base connector for interconnecting the first base shown in FIG. 17 and the second base shown in FIG. 19A;

FIG. 21 is a bottom view of the base connector shown in FIG. 20;

FIG. 22 is a top view of the base connector shown in FIG. 20;

FIG. 23 is a cross-sectional view of the base connector taken along the lines 23-23 in FIG. 20;

FIG. 24 is a rear view of the base connector shown in FIG. 20;

FIG. 25 is a side view of a fastener used with the base connector shown in FIG. 20;

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 3:
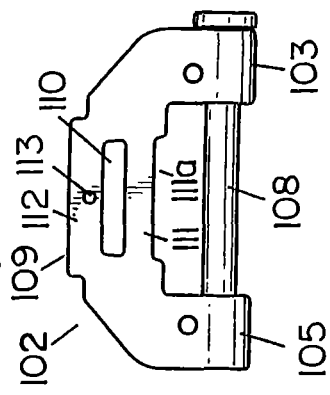
FIG. 3 is a rear view of the connector shown in FIG. 1 in a closed position.
Figure 4:
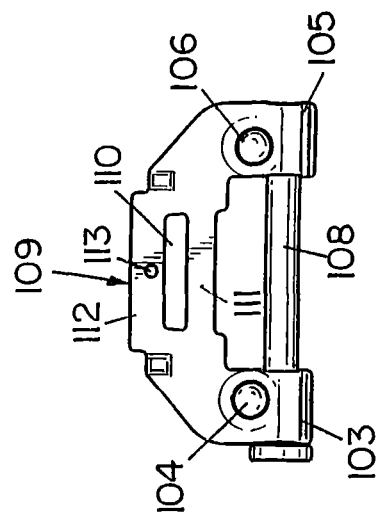
FIG. 4 is a front view of the connector shown in FIG. 1 in a closed position.
Figure 1:
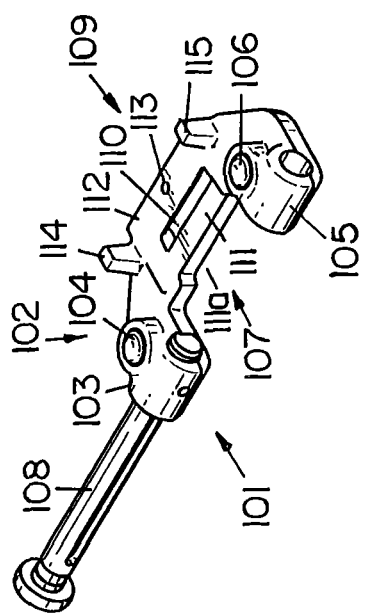
FIG. 1 is a front perspective view of a connector in an open position, the connector being a component of an energy absorber assembly constructed in accordance with the present invention.
Figure 2:
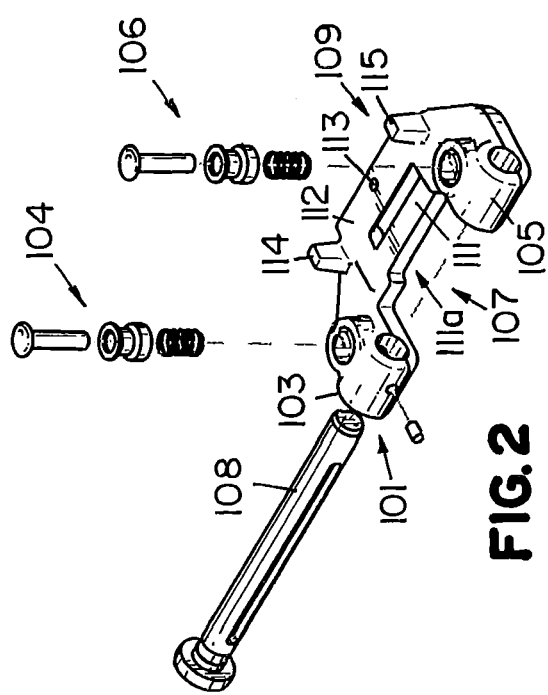
FIG. 2 is an exploded front perspective view of the connector shown in FIG. 1.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide for an energy absorber assembly and components thereof.

One embodiment energy absorber assembly 100 includes a connector 101, a bracket assembly 120, an energy absorber 170, and a cover 190. Although shown with a self-retracting lifeline 135 operatively connected to the bracket assembly 120, it is recognized that any suitable type of lifeline could be used and operatively connected to the bracket assembly 120 with or without modifications to the bracket assembly.

The connector 101 is configured and arranged to operatively connect a safety harness, preferably proximate its dorsal D-ring as is well known in the art, the energy absorber 170, and the self-retracting lifeline 135 via the bracket assembly 120. Generally, as shown in at least FIGS. 1-4, the connector 101 includes a base 102, which is generally U-shaped with a first end 103, a second end 105, and an intermediate portion 109 interconnecting the ends 103 and 105. The ends 103 and 105 define an opening 107 therebetween. The first end 103 includes a first locking assembly 104 and the second end 105 includes a second locking assembly 106 configured and arranged to selectively engage a gate 108. The gate 108 extends through bores in the ends 103 and 105 and spans the opening 107 in a locked position, in which the locking assemblies 104 and 106 prevent the gate 108 from moving. In an unlocked position, in which the locking assemblies 104 and 106 are compressed, the gate 108 slides out of the bore in end 105 to allow access to the opening 107. The connector 101 is similar to that disclosed in U.S. patent application Ser. No. 13/660,532, which is hereby incorporated by reference in its entirety. This aspect of the connector 101 is described in detail in U.S. patent application Ser. No. 13/660,532.

The intermediate portion 109, which differs from the connector disclosed in U.S. patent application Ser. No. 13/660,532, includes a slot 110 forming a first bar portion 111 proximate the opening 107 and a second bar portion 112 opposite the ends 103 and 105. The first bar portion 111 includes a recessed portion 111a on a side proximate the ends 103 and 105, and the second bar portion 112 includes an aperture 113 proximate its center. A first protrusion 114 extends outwardly at approximately a right angle proximate the second bar portion 112 and the first side 103, and a second protrusion 115 extends outwardly at approximately a right angle proximate the second bar portion 112 and the second side 105.

Figure 5:
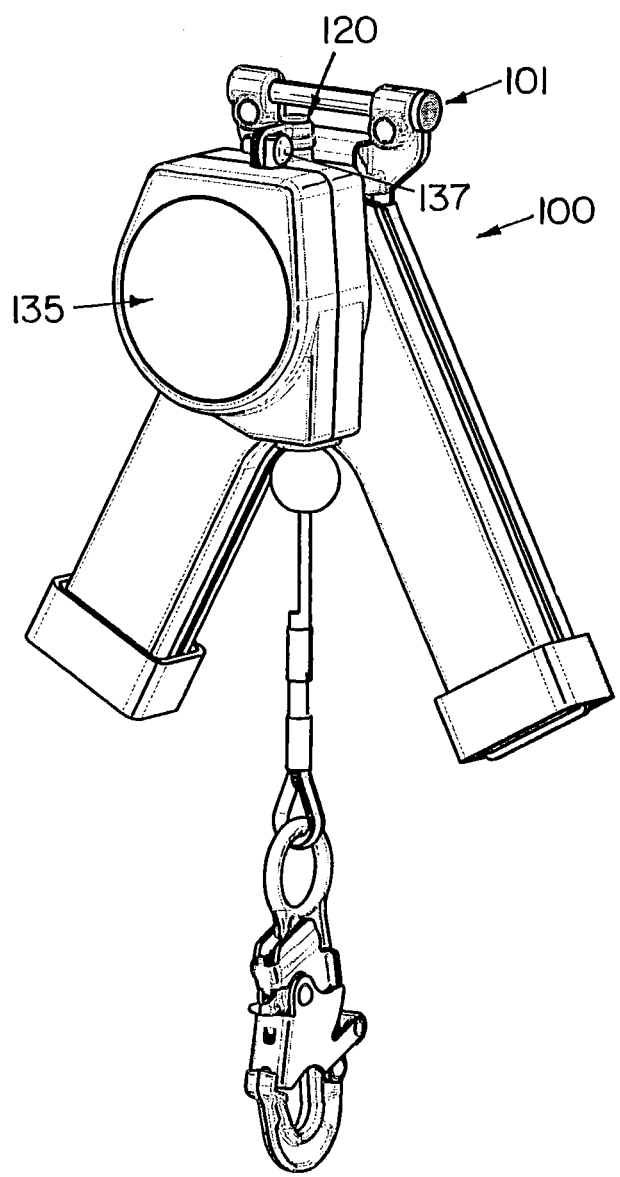
FIG. 5 is a front perspective view of an energy absorber assembly constructed in accordance with the present invention.
Figure 6:
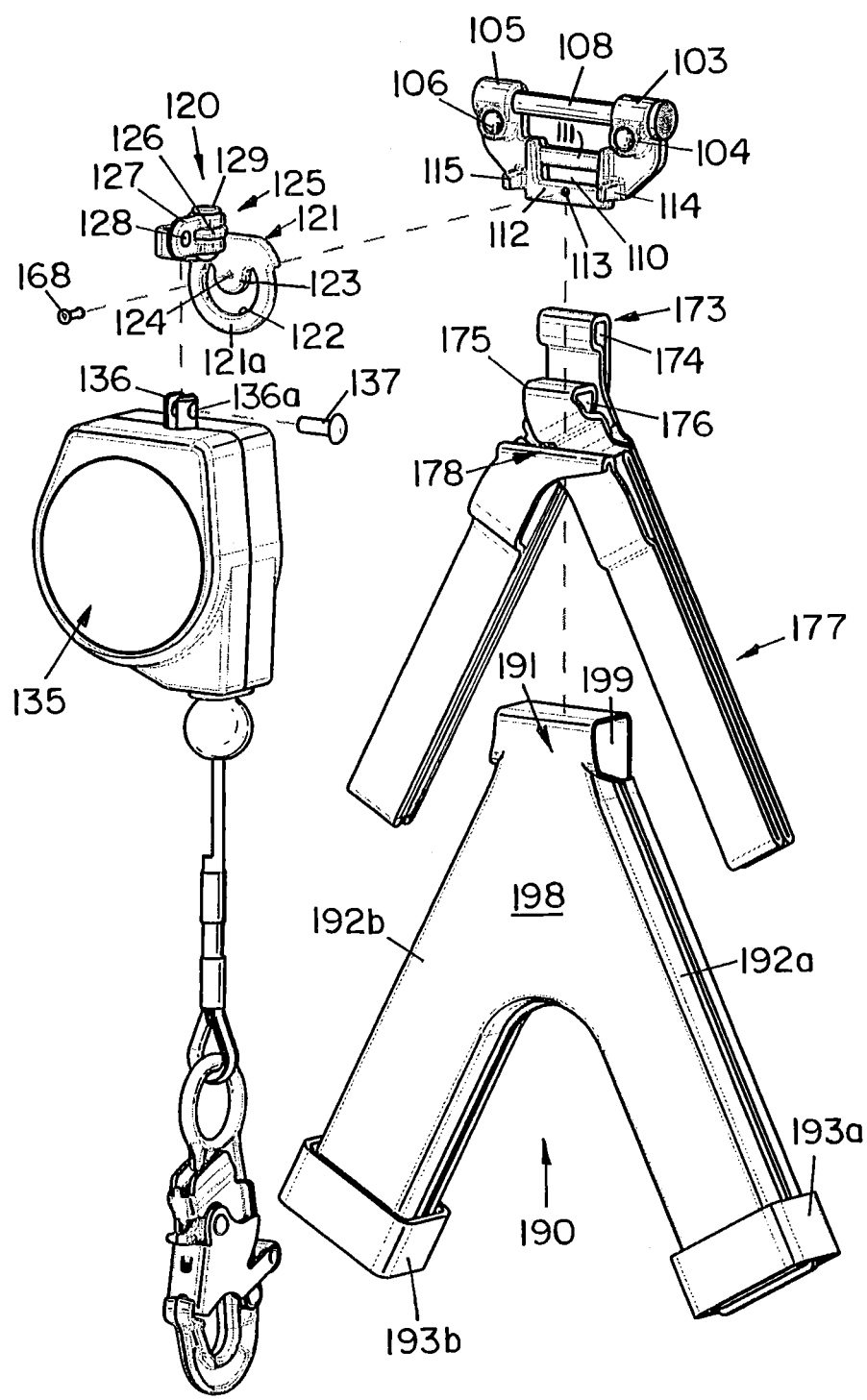
FIG. 6 is an exploded front perspective view of the energy absorber assembly shown in FIG. 5.

In this embodiment, a bracket assembly 120 is used. As shown in at least FIGS. 5 and 6, the bracket assembly 120 includes a circular base 121 with a crescent shaped slot 122 proximate its bottom that forms a bar portion 121a proximate the bottom of the slot 122 and a tab portion 123 proximate the top of the slot 122. The tab portion 123 extends downward relative to the base 121 and includes an aperture 124. One side of the base 121 includes a swivel connector portion 125. The swivel connector portion 125 includes a stationary portion 126, a swivel portion 127, and a fastener 129 interconnecting the portions 126 and 127. The stationary portion 126 includes an extension arm 126a, which extends outward in a U-shaped manner from proximate the top of the base 121, and a flange 126b, which extends laterally outward from the extension arm 126a proximate the center top of the base 121 and includes and aperture 126c. This is shown in at least FIGS. 11-13. The swivel portion 127 includes a tab portion 127a and a two prong portion 127b, which includes two legs extending outward from the tab portion 127a at a distance from one another to form an opening 127c therebetween. The tab portion 127a includes an aperture 128 and the legs of the two prong portion 127b include aligning apertures 130. The opening 127c is configured and arranged to receive the flange 126b and the apertures 126c and 130 align. The base 121, including the stationary portion 126, and the swivel portion 127 are preferably made of alloy steel. The fastener 129, which could be a rivet as shown, extends through the apertures 126c and 130 to connect the stationary portion 126 and the swivel portion 127 in a manner that allows the swivel portion 127 to swivel or pivot relative to the stationary portion 126. The other side of the base 121, opposite the swivel portion 127, includes a shoulder portion 131 extending outward therefrom. A fastener 168, such as a rivet as shown, extends through the aperture 124 of the bracket assembly 120 and the aperture 113 of the connector 101. The bracket assembly 120 is pivotable about the fastener 168 relative to the connector 101, and the swivel connector portion 125 and the shoulder portion 131 contact the respective protrusions 114 and 115, which act likes stops to limit rotation of the bracket assembly 120. A lifeline, such as a self-retracting lifeline 135 including a connector portion 136, is operatively connected to the bracket assembly 120 by a fastener 137 extending through the aperture 128 of the swivel portion 127 and the apertures 136*a* of the connector portion 136. This bracket assembly 120 provides a universal joint configuration allowing the lifeline to be orientated in many directions with little restriction.

The energy absorber 170 includes a first portion 171 and a second portion 172 operatively connected by any suitable means well known in the art. One example of how the portions 171 and 172 could be connected is described in U.S. patent application Ser. No. 13/656,119 filed Oct. 19, 2012 and U.S. patent application Ser. No. 13/463,986 filed May 4, 2012, which are hereby incorporated by reference in their entirety. The energy absorber 170 is schematically illustrated in an unassembled position in FIG. 10. The first portion 171 has a first end 171*a* and a second end 171*b*, and the second portion 172 has a first end 172*a* and a second end 172*b*. The portions 171 and 172 are operatively connected proximate an intermediate portion 177 of the energy absorber 170. The first ends 171*a* and 172*a* are positioned proximate one another and the second ends 171*b* and 172*b* are positioned proximate one another.

To connect the energy absorber 170 to the connector 101, one of the first end 171*a* of the first portion 171 and the second end 172*b* of the second portion 172 is positioned proximate the recessed portion 111*a* of the first bar portion 111, the other of the first end 171 a of the first portion 171 and the second end 172*b* of the second portion 172 is positioned proximate the slot 110, and the ends 171 a and 172*b* are operatively connected, such as by stitching, as a first connection 173 to form a first loop 174 about the first bar portion 111.

To connect the energy absorber 170 to the bracket assembly 120, one of the second end 171*b* of the first portion 171 and the first end 172*a* of the second portion 172 is inserted through the slot 122 from one side of the base 121, the other of the second end 171*b* of the first portion 171 and the first end 172*a* of the second portion 172 is positioned proximate the other side of the base 121, and the ends 171*b* and 172*a* are operatively connected, such as by stitching, as a second connection 175 to form a second loop 176 about the bar portion 121*a* of the base 121.

Figure 30:
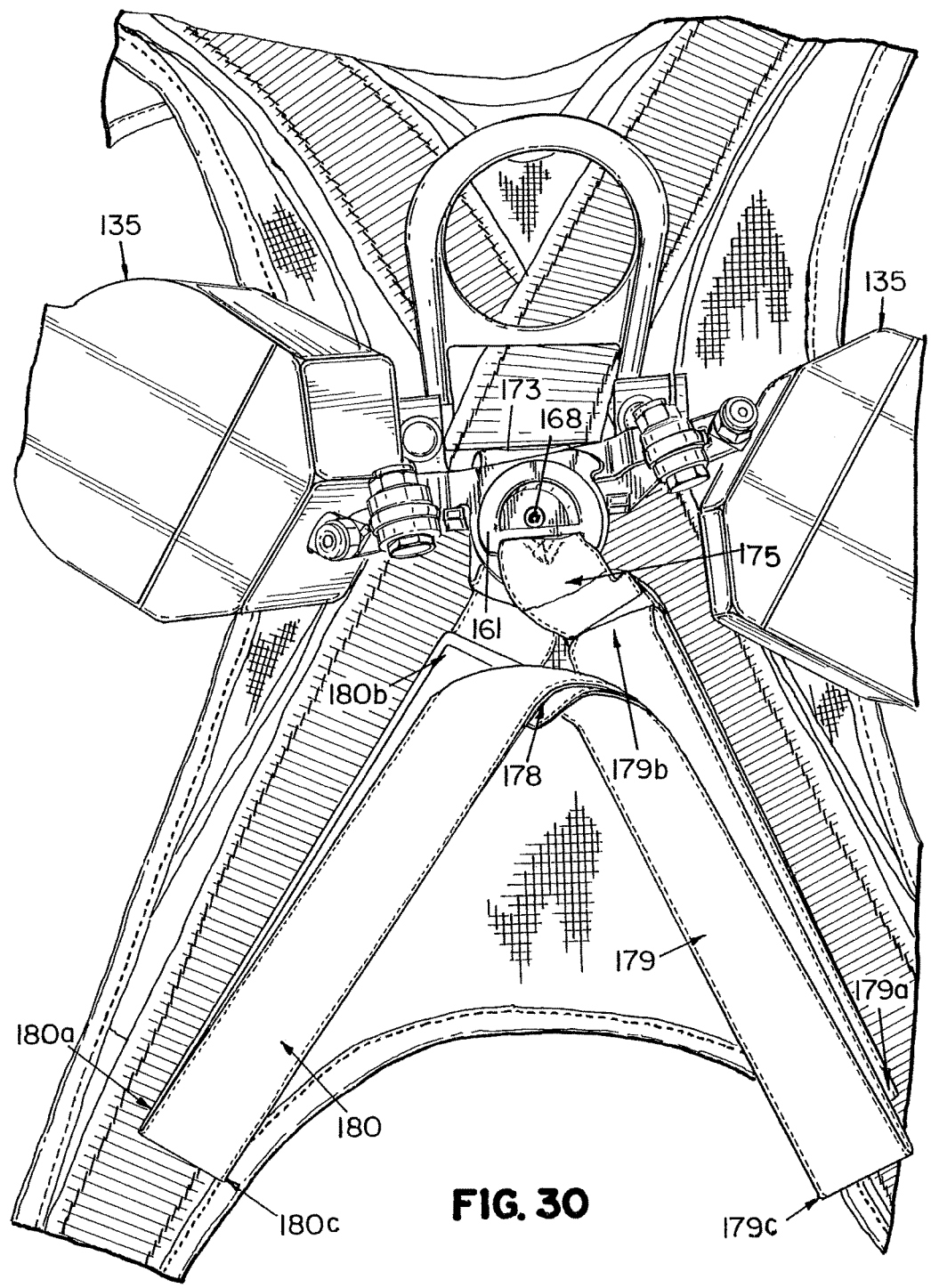
FIG. 30 is a front view of an energy absorber of the energy absorber assembly shown in FIG. 26.
Figure 31:
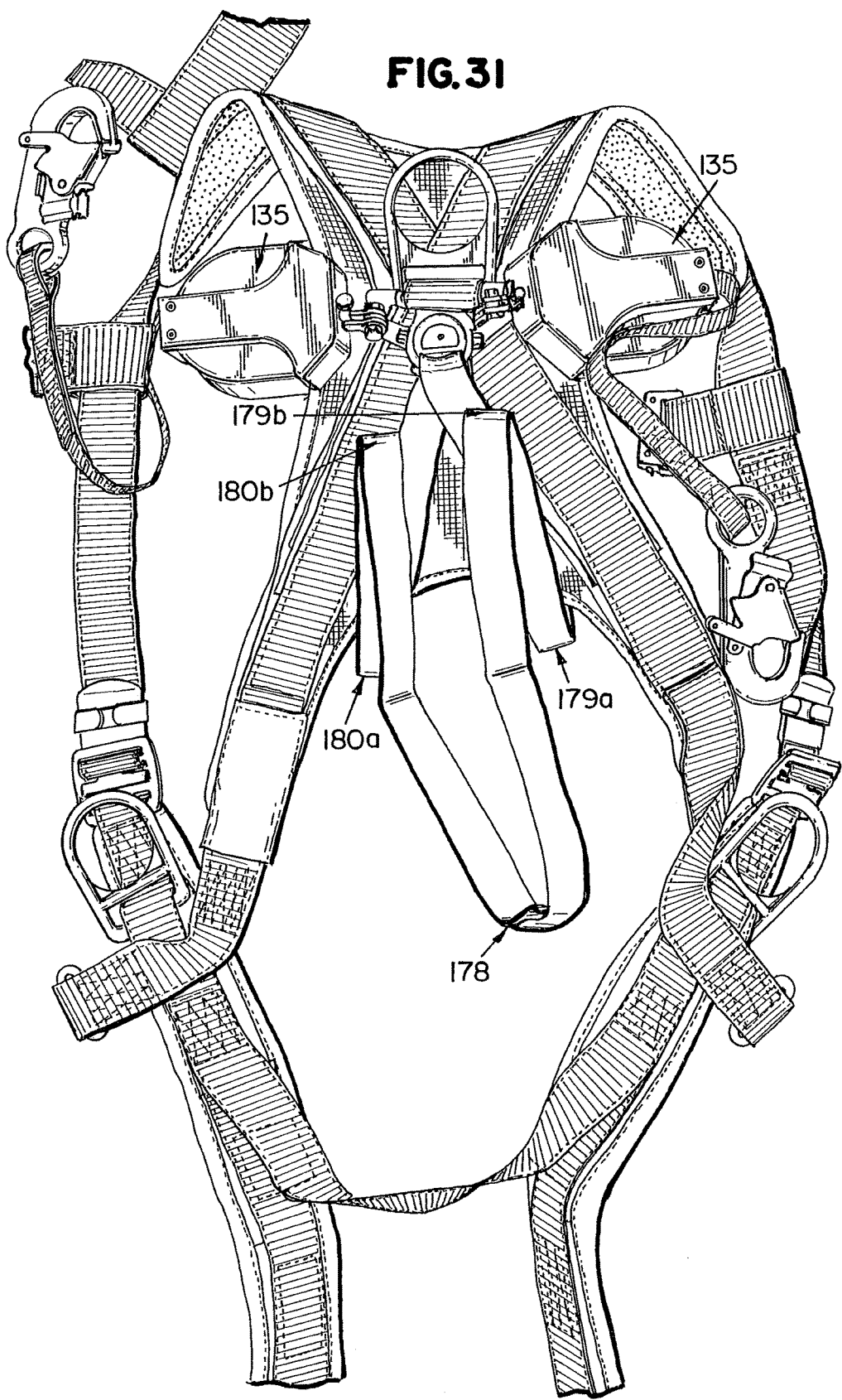
FIG. 31 is a front view of the energy absorber shown in FIG. 30 with an intermediate portion partially unfolded.
Figure 32:
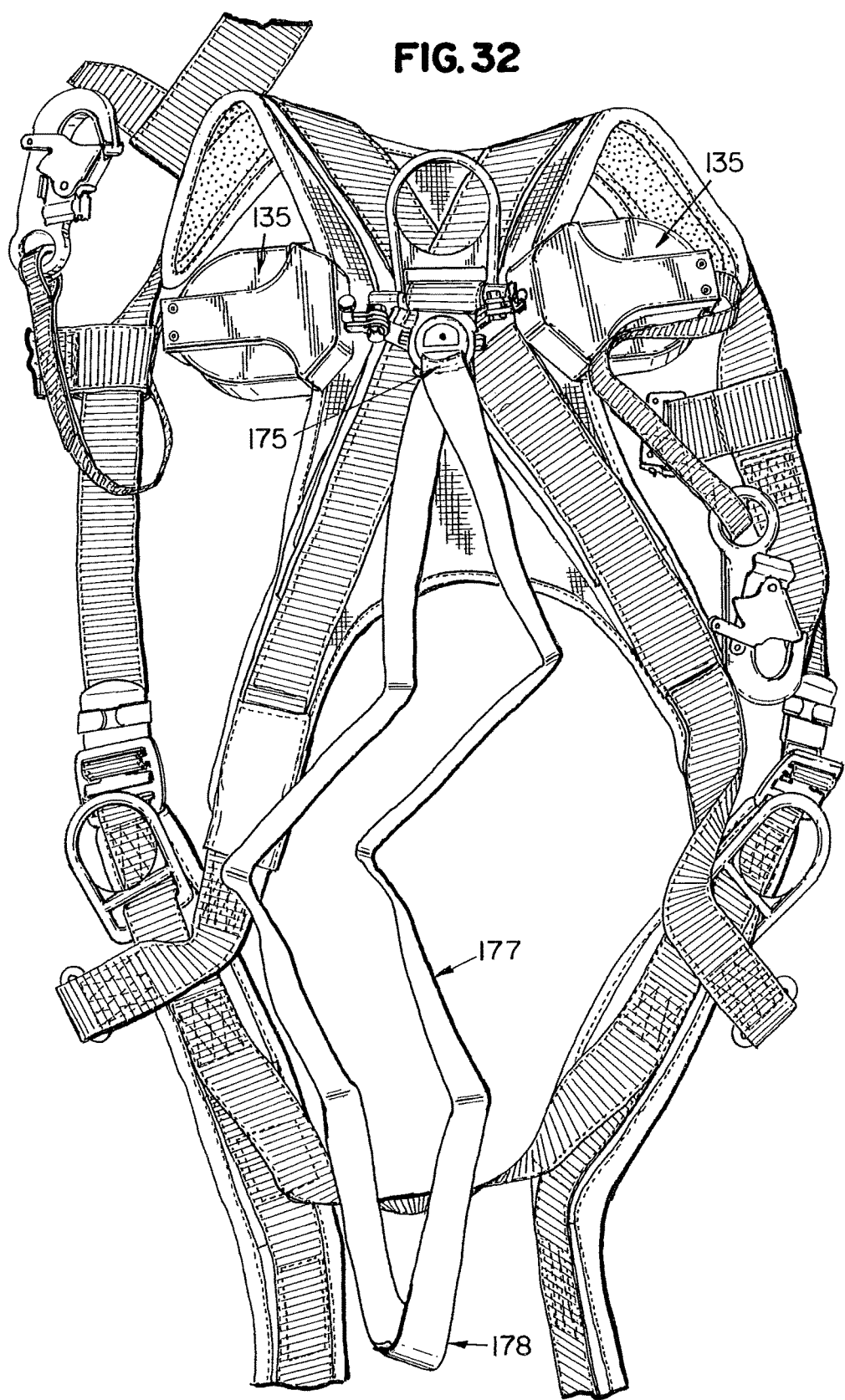
FIG. 32 is a front view of the energy absorber shown in FIG. 30 with the intermediate portion substantially unfolded.
Figure 33:
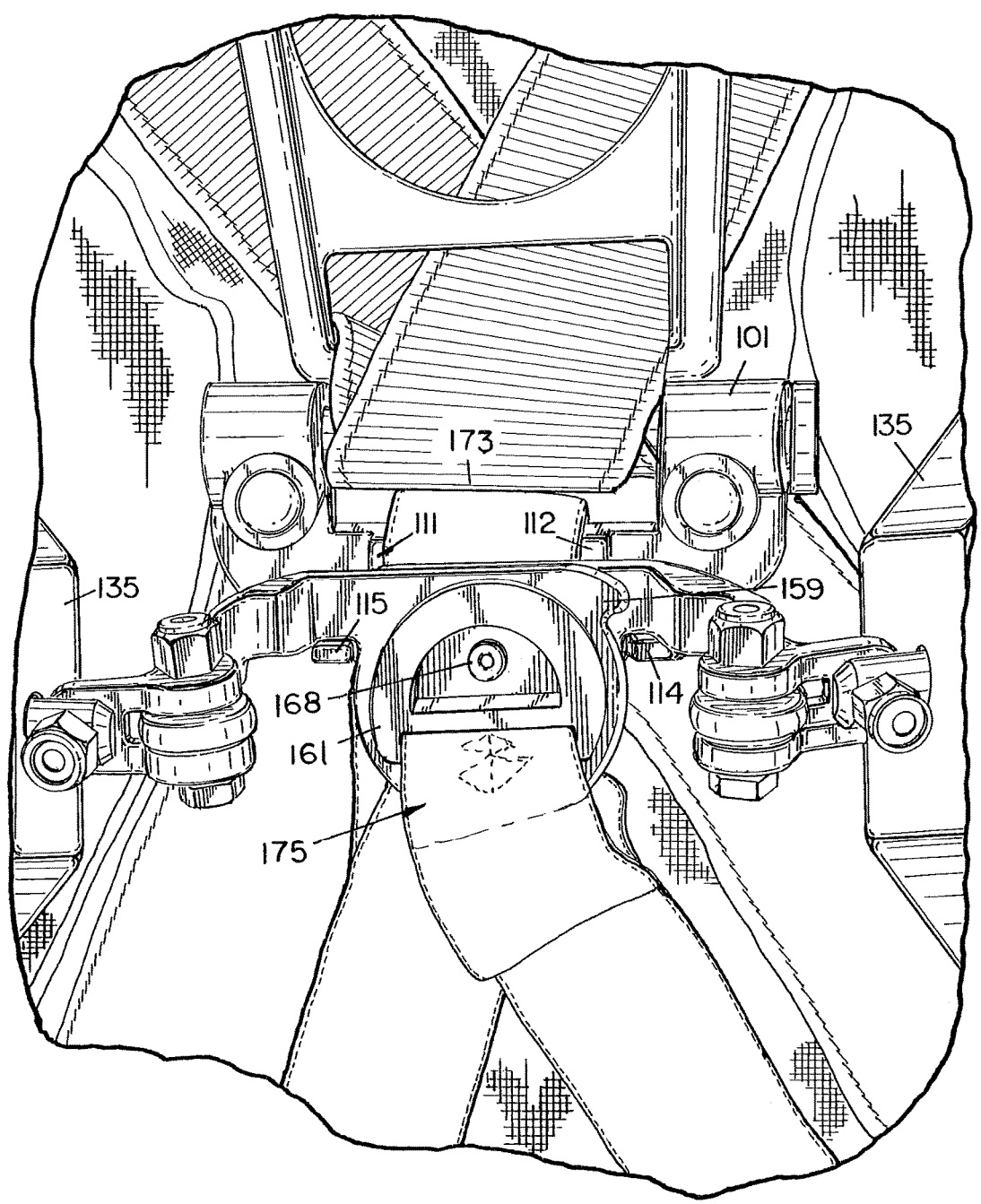
FIG. 33 is a front view of a bracket assembly of the energy absorber assembly shown in FIG. 26.
Figure 34:
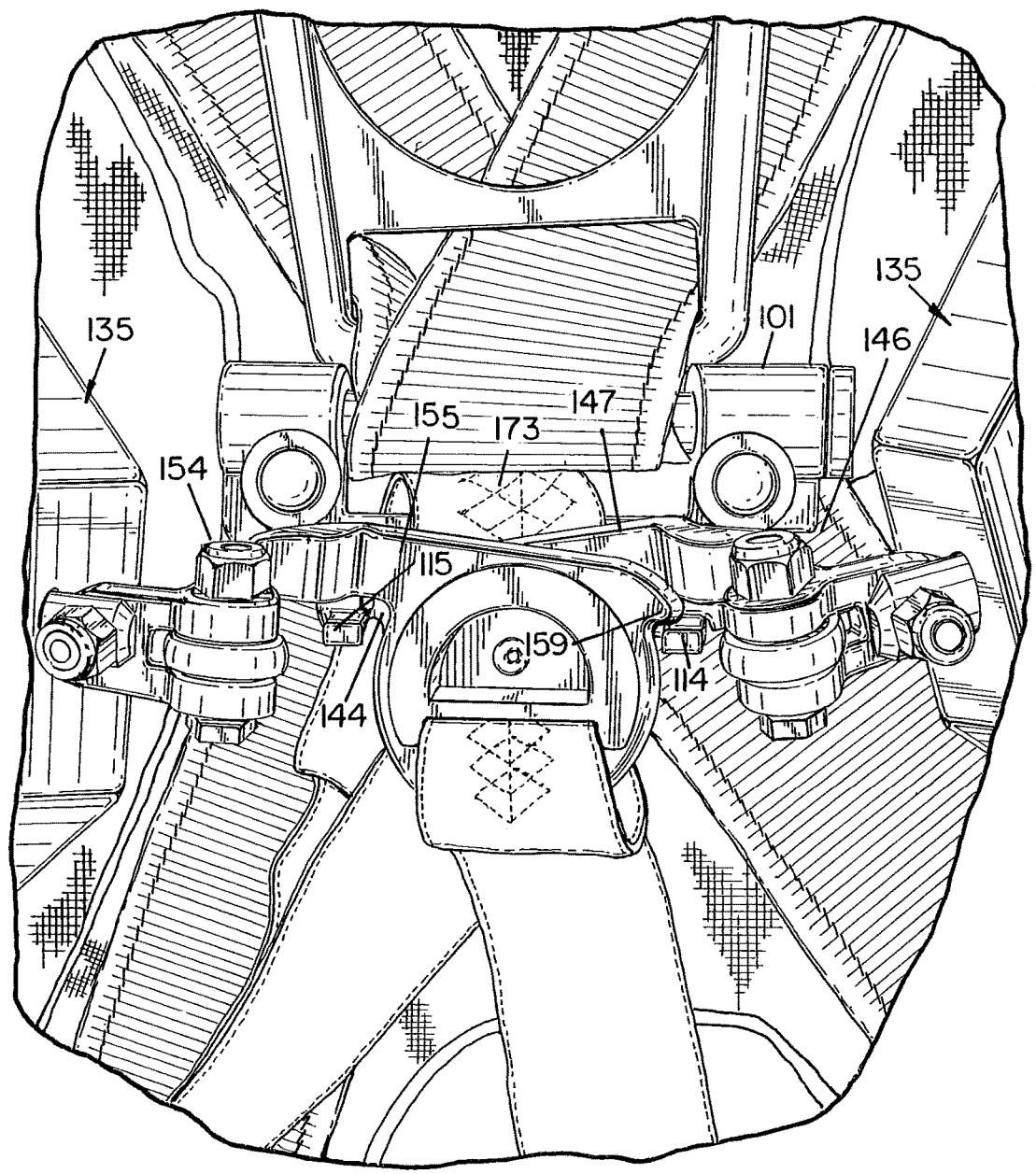
FIG. 34 is a front view of the bracket assembly shown in FIG. 33.
Figure 35:
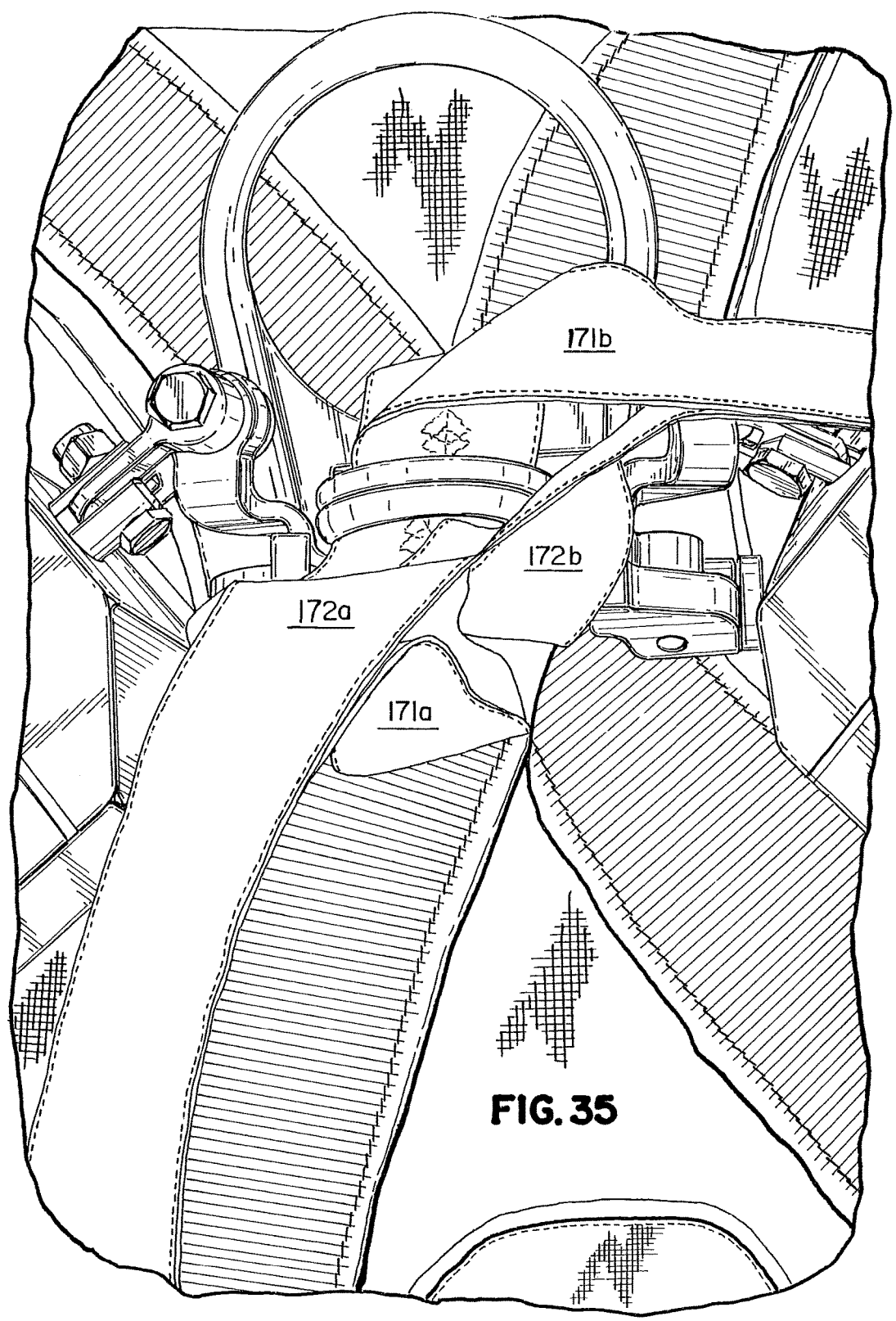
FIG. 35 is a bottom view of first and second bases of the bracket assembly shown in FIG. 33.
Figure 36:
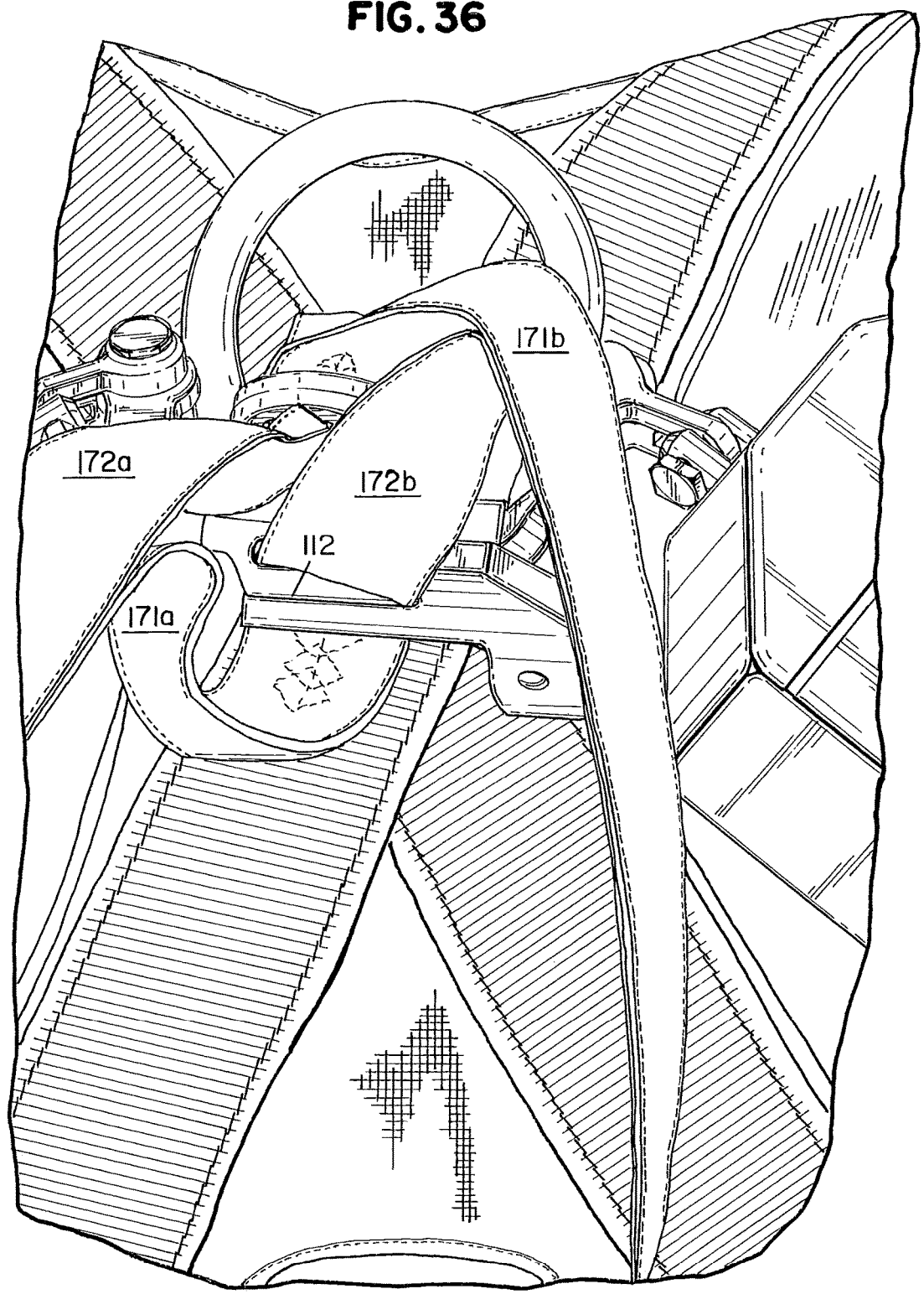
FIG. 36 is a bottom view of a connector of the energy absorber assembly shown in FIG. 26.
Figure 37:
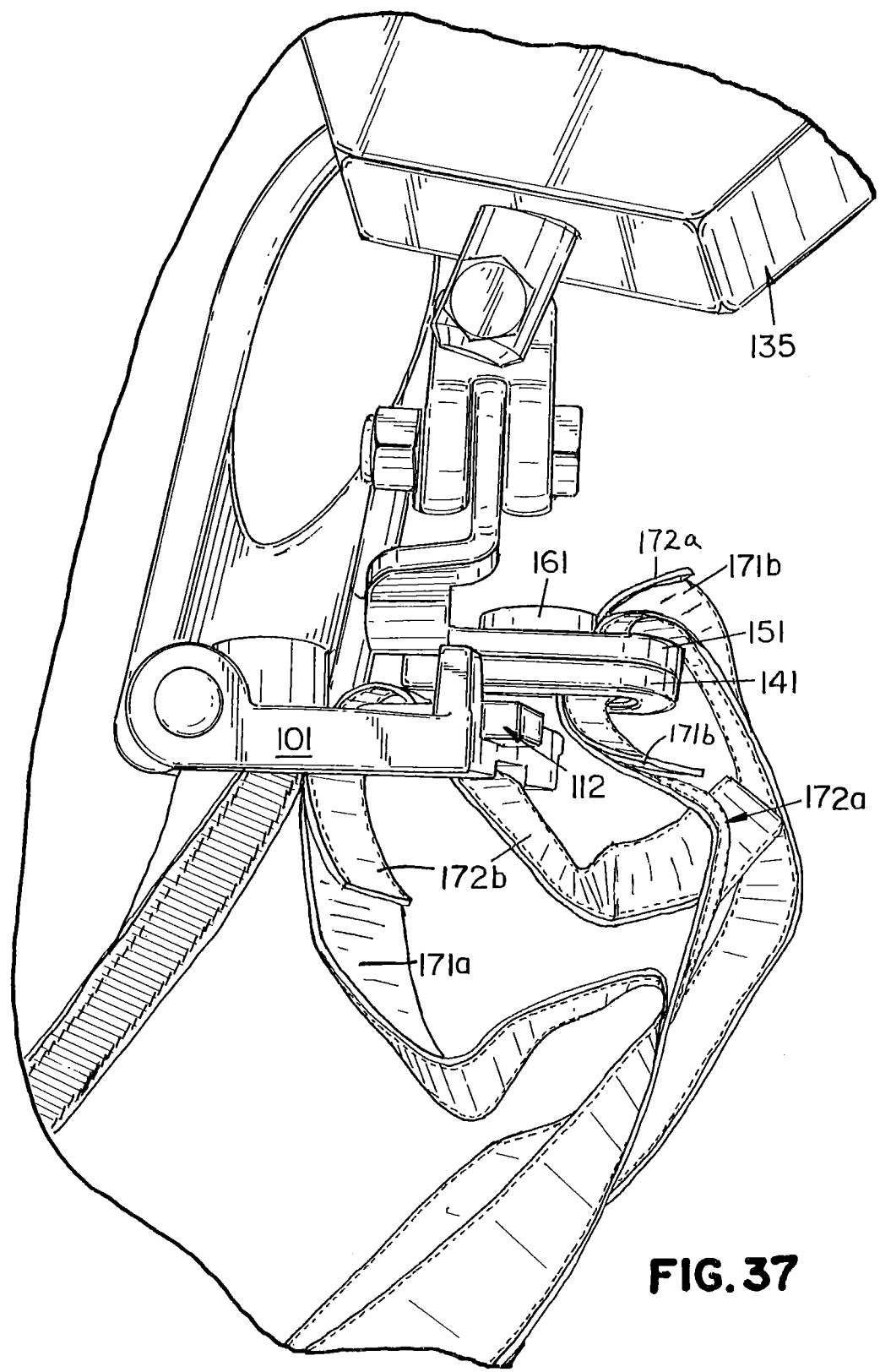
FIG. 37 is a side view of the energy absorber assembly with the cover removed to show how the energy absorber is connected to the connector and the bracket assembly.

After the energy absorber 170 is connected to the other components, it is folded to form an upside down V-shape, which corresponds to the shape of the shoulder straps of the safety harness. The energy absorber 170 includes a first side 179, a second side 180, and a bottom portion 178, which interconnects the sides 179 and 180. It does not matter on which sides of the safety harness the sides 179 and 180 of the energy absorber 170 are positioned. Generally, as shown in FIGS. 30-32, each side of the energy absorber 170 is folded three times so that each segment between folds is approximately the same length. The first side 179 includes a first fold 179*a*, a second fold 179*b*, and a third fold 179*c*.

The second side 180 includes a first fold 180*a*, a second fold 180*b*, and a third fold 180*c*. The bottom portion 178 is positioned proximate the connections 173 and 175, which form the point of the "V". Once positioned in a folded configuration, a cover 190 can be positioned about the energy absorber 170 to assist in keeping it in its folded configuration.

As shown in at least FIGS. 26-29, the cover 190 is generally a sleeve having an upside down V-shaped configuration corresponding to the energy absorber 170 in its folded configuration. The cover 190 includes a top portion 191, a first leg 192*a*, and a second leg 192*b*. Proximate the bottom, the first leg 192*a* includes a first connecting member such as a first strap 193*a* with a first end 194*a*, a second end 196*a*, and a first fastener assembly 197*a*, which is configured and arranged to releasably connect the ends 194*a* and 196*a*. Proximate the bottom, the second leg 192*b* includes a second connecting member such as a second strap 193*b* with a first end 194*b*, a second end 196*b*, and a second fastener assembly 197*b*, which is configured and arranged to releasably connect the ends 194*b* and 196*b*. As shown, each of the fastener assemblies 197*a* and 197*b* includes mating hook and loop but it is recognized that other suitable fastener assemblies could be used to connect the respective ends.

Figure 28:
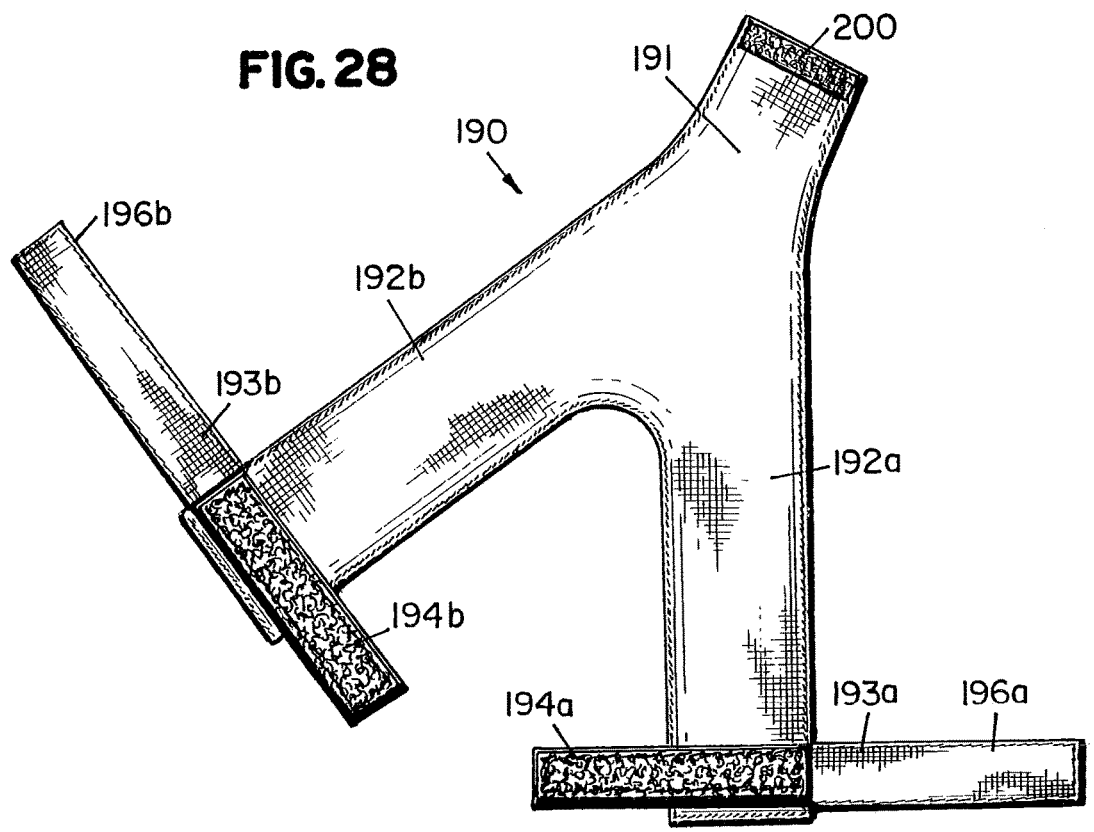
FIG. 28 is a front view of the cover shown in FIG. 27.
Figure 29:
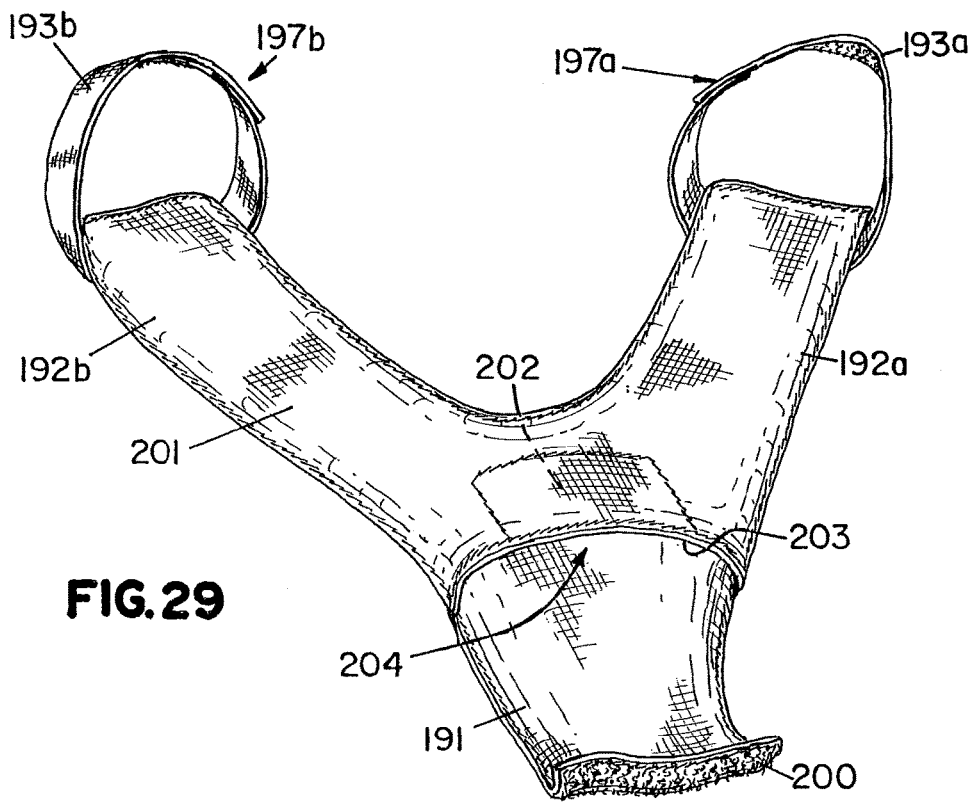
FIG. 29 is a rear view of the cover shown in FIG. 27.

The front side 198 of the cover 190 is shown in FIG. 28. A flap portion 199 extends upward from the top portion 191 and includes a first portion 200 of a fastener, for example one of mating hook and loop. The rear side 201 of the cover 190 is shown in FIG. 29. The top portion 191 includes an opening 203 between the front side 198 and the rear side 201, which form a cavity 204 therebetween. The rear side 201 includes a second portion 202 of the fastener, for example, the other of mating hook and loop, proximate a top of the rear side 201. It is recognized that other suitable fasteners could be used such as but not limited to snaps.

Figure 26:
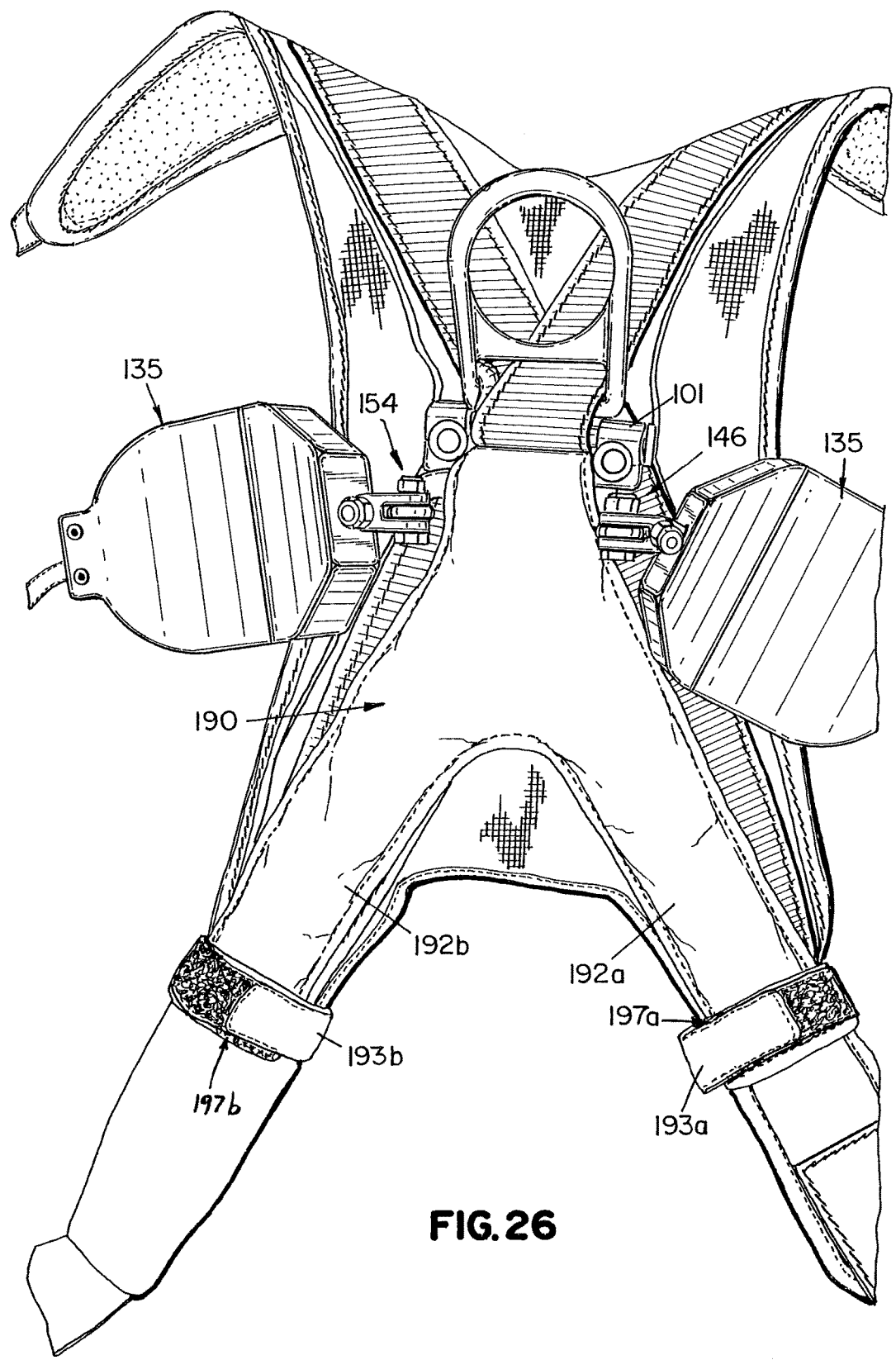
FIG. 26 is a front view of another embodiment energy absorber assembly operatively connected to a safety harness and two self-retracting lifelines.
Figure 27:
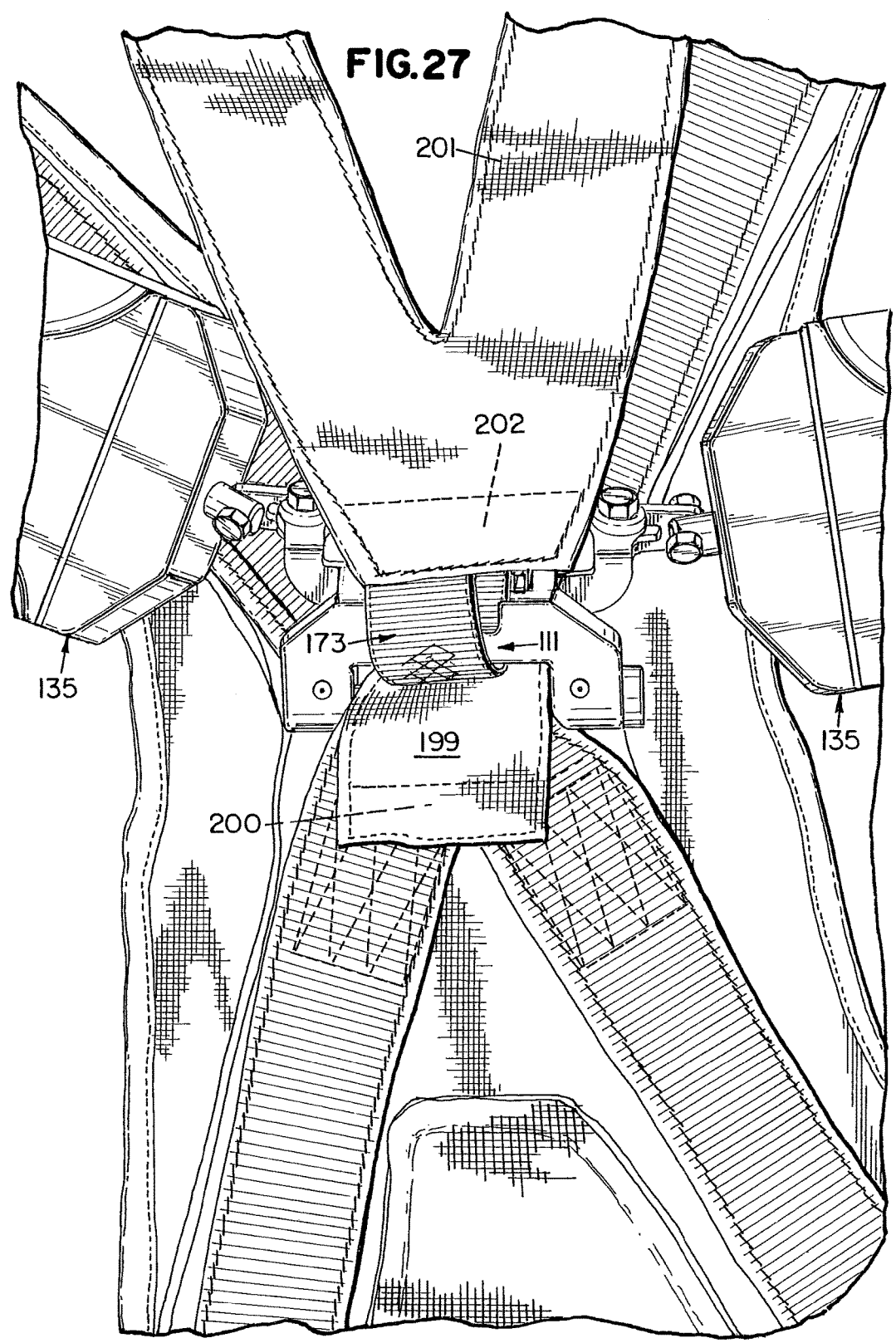
FIG. 27 is a rear view of a cover of the energy absorber assembly shown in FIG. 26.

To put the cover 190 on the energy absorber 170, the first side 179 is inserted through the opening 203 and in the cavity 204 proximate the first leg 192*a* and the second side 180 is inserted through the opening and in the cavity 204 proximate the second leg 192*b*. The sides 179 and 180 may be positioned in the cavity 204 in any order and even substantially simultaneously. Then, the top portion 191 is inserted through the slot 110 of the connector 101, as shown in FIG. 27, so that it can be inserted through the opening 204 and the fasteners 200 and 202 mate. The straps 193*a* and 193*b* are wrapped around the shoulder straps of the safety harness and the ends of the respective straps are connected as shown in FIG. 26.

Should a fall occur, the fastener 168 deforms or breaks so that the bracket assembly 120 disconnects from the connector 101, the top portion 191 of the cover 190 disconnects from the rear side 201, and the portions 171 and 172 of the energy absorber 170 begin to separate and come out of the cover 190 thereby reducing the rate of fall and the amount of force exerted on the user from the fall. Depending upon the distance of the fall, varying lengths of the portions 171 and 172 could separate.

Another embodiment energy absorber assembly 100' is similar to the energy absorber assembly 100 except that it includes a bracket assembly 140 for connecting two self-retracting lifelines 135 to the connector 101. Because the energy absorber assembly 100' is similar to the energy absorber assembly 100, only significant differences will be described in detail.

Figure 8:
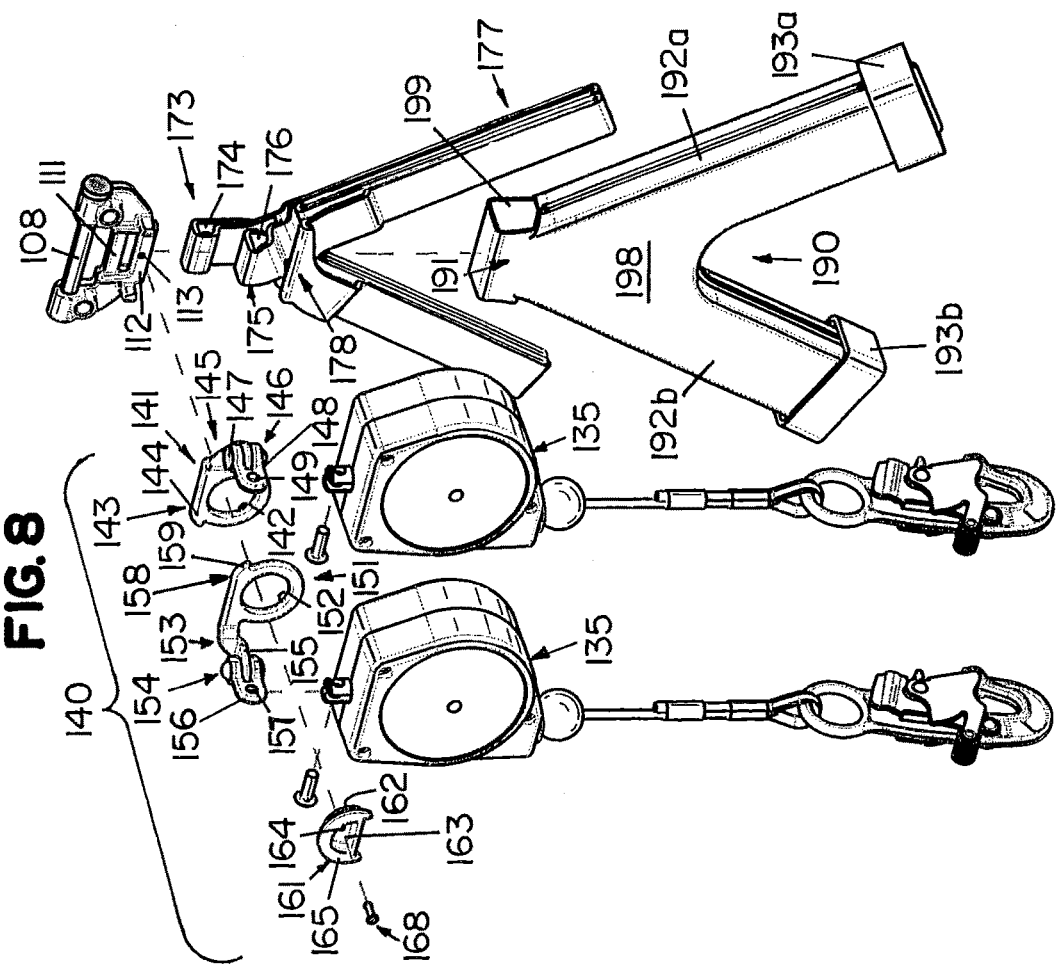
FIG. 8 is an exploded front perspective view of the energy absorber assembly shown in FIG. 7.
Figure 7:
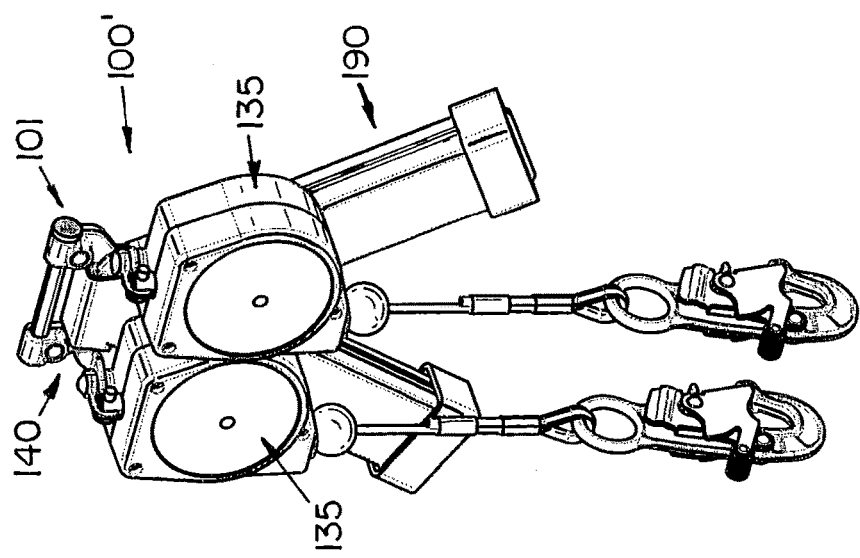
FIG. 7 is a front perspective view of another embodiment energy absorber assembly constructed in accordance with the present invention.
Figure 9:
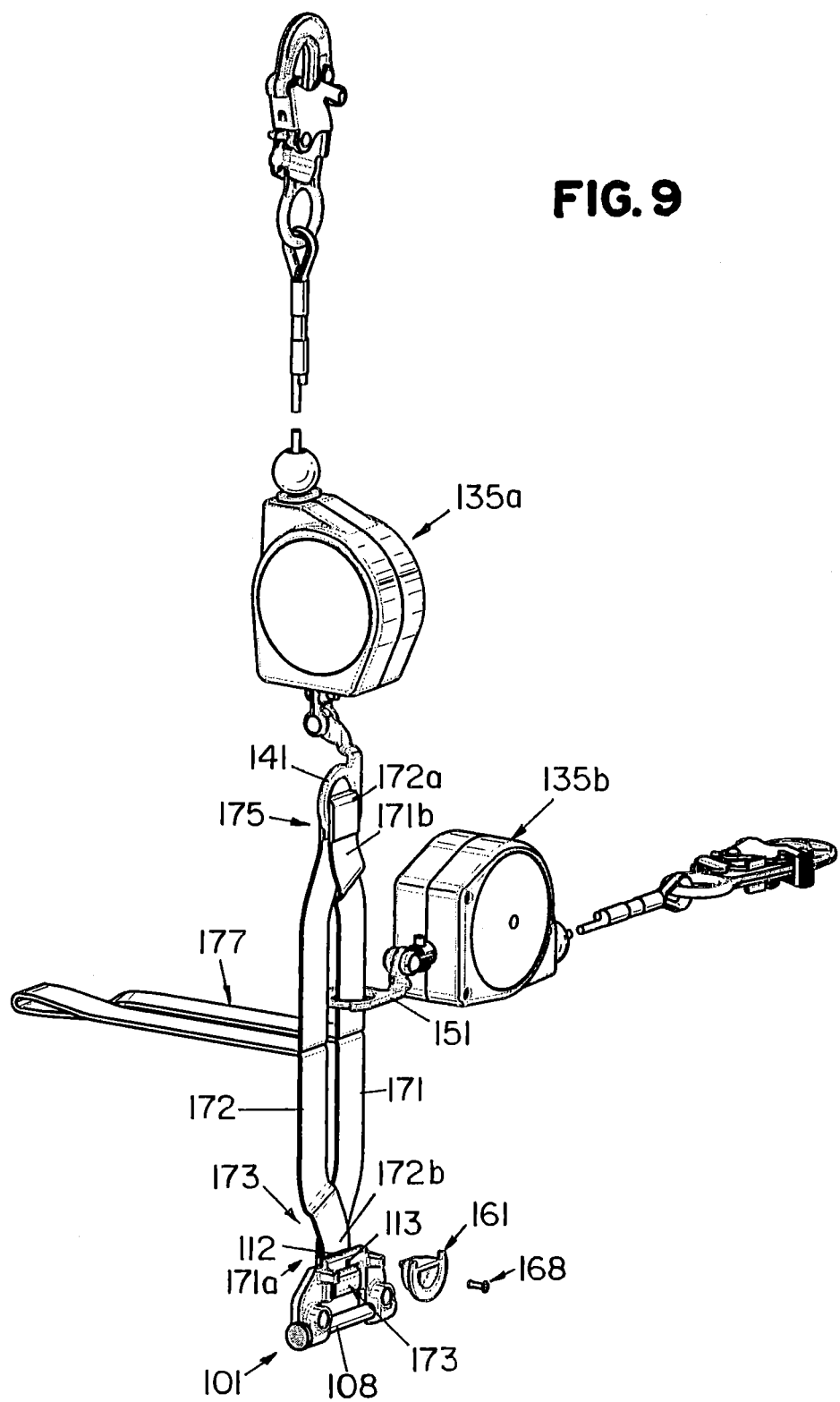
FIG. 9 is a front perspective view of the energy absorber assembly shown in FIG. 7 illustrating an energy absorbing position.

As shown in at least FIGS. 7-9, the bracket assembly 140 includes a first circular base 141 configured and arranged to operatively connect to a first self-retracting lifeline 135 and a second circular base 151 configured and arranged to operatively connect to a second self-retracting lifeline 135.

The first circular base 141, shown in at least FIGS. 17 and 18, is generally ring-like and includes an aperture 142. A first side 143 of the base 141 includes a protrusion 144 extending outward proximate the top, and a second side 145 of the base 141 includes a first swivel connector portion 146 extending outward proximate the top. The first swivel connector portion 146 includes a stationary portion 147, which includes an extension arm 147a and a flange 147b having an aperture 147c. Rather than extending inward in a U-shaped manner like the stationary portion 126 of the bracket assembly 120, the stationary portion 147 extends outward as shown in FIG. 18. A swivel portion 148 is operatively connected to the flange 147b similarly as the swivel portion 127 is operatively connected to the flange 126b. The swivel portion 148 includes an aperture 149 for connecting a self-retracting lifeline 135 thereto as is well known in the art.

The second circular base 151, shown in at least FIGS. 19A and 19B, is generally a mirror image of the first circular base 141. The second circular base 151 is generally ring-like and includes an aperture 152. A first side 153 of the base 151 includes a second swivel connector portion 154 extending outward proximate the top, and a second side 158 of the base 151 includes a protrusion 159 extending outward proximate the top. The second swivel connector portion 154 includes a stationary portion 155 and a swivel portion 156, which are similar to those of the first swivel connector portion 146. The swivel portion 156 includes an aperture 157 for connecting a self-retracting lifeline 135 thereto as is well known in the art.

A base connector 161, shown in at least FIGS. 20-24, is configured and arranged to operatively connect the circular bases 141 and 151 to the connector 101. The base connector 161 is preferably made of nylon. The base connector 161 includes a generally cylindrical portion 162 to which a plate portion 163 is operatively connected proximate one side and a flange portion 165 is operatively connected proximate an opposing side. The plate portion 163 includes an aperture 164 proximate the center of the cylindrical portion 162. A segment is removed from the cylindrical portion 162 to form a bottom 166, which includes an extension 166a extending outward from the plate portion 163. An opening 167 is formed by the flange portion 165 and the bottom 166.

The circular bases 141 and 151, which are preferably made of alloy steel, are positioned together with the swivel connector portions 146 and 154 extending outward from opposing sides and the apertures 142 and 152 aligning. The base connector 161 is inserted through the apertures 142 and 152 so that the ring portions are proximate the cylindrical portion 162. A fastener 168 extends through the aperture 164 and the aperture 113 to connect the base connector 161 to the connector 101. The extension 166a of the base connector 161 is positioned below the second bar portion 112 of the connector 101 to prevent the base connector 161 from pivoting relative to the connector 101. Therefore, the circular bases 141 and 151 are positioned between the connector 101 and the flange portion 165. The circular bases 141 and 151 pivot independently relative to the connector 101 and the base connector 161, and the swivel connector portions 146 and 154 and the protrusions (shoulder portions) 144 and 159 contact the respective protrusions 114 and 115, which act likes stops to limit rotation of the circular bases 141 and 151.

Similar to the bracket assembly 120, the energy absorber 170 is connected to the bracket assembly 140 by inserting one of the second end 171b of the first portion 171 and the first end 172a of the second portion 172 through the apertures 142 and 152 from one side of the circular bases 141 and 151, the other of the second end 171b of the first portion 171 and the first end 172a of the second portion 172 is positioned proximate the other side of the circular bases 141 and 151, and the ends 171b and 172a are operatively connected, such as by stitching, as a second connection 175 to form a second loop 176 about the ring portions of the bases 141 and 151. The energy absorber 170 may be connected to the bracket assembly 140 before the base connector 161 is inserted through the apertures 142 and 152 or after the base connector is inserted through the apertures 142 and 152 and connected to the connector 101.

Should a fall occur, the fastener 168 deforms or breaks so that the base connector 161 disconnects from the connector 101 thereby releasing the circular bases 141 and 151 from the connector, the top portion 191 of the cover 190 disconnects from the rear side 201, and the portions 171 and 172 of the energy absorber 170 begin to separate and come out of the cover 190 thereby reducing the rate of fall and the amount of force exerted on the user from the fall. Depending upon the distance of the fall, varying lengths of the portions 171 and 172 could separate.

FIG. 9 illustrates how the circular bases 141 and 151 may be positioned during a fall. The connector 101 is operatively connected to the user's safety harness, and the first self-retracting lifeline 135a is operatively connected to a support structure. As the portions 171 and 172 of the energy absorber 170 separate, the second self-retracting lifeline 135b simply slides along a portion of the energy absorber 170 as the portions 171 and 172 continue to separate. If the second self-retracting lifeline 135b were connected to a support structure, the first self-retracting lifeline would similarly slide along a portion of the energy absorber 170 as the portions 171 and 172 separate.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A cover for an energy absorber operatively connected to a safety harness, the energy absorber including a first energy absorber portion and a second energy absorber portion configured and arranged to separate and absorb energy when subjected to a force from a fall, the cover comprising:

a front side and a rear side, the front side and the rear side operatively connected to form a single first leg and a single second leg extending downward in a single upside down V-shape, the front side having a top portion including a first portion of a fastener, the rear side having a top including a second portion of the fastener, wherein the first portion of the fastener is configured to engage with the second portion of the fastener to connect and disconnect the top portion to the rear side, the front side and the rear side forming an opening proximate the top, the opening configured and arranged to provide access to a cavity formed between the front side and rear side; and a first connecting member proximate a distal end of the single first leg and a second connecting member proximate a distal end of the single second leg, the first connecting member configured and arranged to operatively connect the single first leg to a first strap of the safety harness, and the second connecting member configured and arranged to operatively connect the single second leg to a second strap of the safety harness.

2. The cover of claim 1, wherein the top portion includes a flap portion extending upward from the first and second legs, the flap portion being configured and arranged to engage a connector interconnecting the energy absorber and the safety harness.

3. The cover of claim 2, wherein the first portion of the fastener further selectively connects the flap portion to the first and second legs.

4. The cover of claim 1, wherein the fastener is configured to release to allow the energy absorber to operate when the energy absorber is subjected to a predetermined load.

5. The cover of claim 1, wherein the fastener is a hook and loop fastener.

6. The cover of claim 1, wherein the first and second connecting members are straps including ends with mating releasable fasteners.

7. A cover for an energy absorber operatively connected to a safety harness, the energy absorber including a first energy absorber portion and a second energy absorber portion configured and arranged to separate and absorb energy when subjected to a force from a fall, the cover comprising:
a front side and a rear side, the front side and the rear side operatively connected to form a single first leg and a single second leg extending downward in a single upside down V-shape, the front side having a top portion including a first portion of a fastener, the rear side having a top including a second portion of the fastener, the rear side and the front side defining a cavity therebetween and an opening; said cavity is configured and arranged to keep the energy absorber in a folded upside down V-shape configuration and said opening is configured and arranged to provide access to the cavity proximate the top of the rear side, the first and second portions of the fastener are configured to engage one another to connect and disconnect the top portion of the front side and the top of the rear side; a first strap operatively connected to the single first leg, the first strap configured and arranged to engage a first shoulder strap of the safety harness; and a second strap operatively connected to the single second leg, the second strap configured and arranged to engage a second shoulder strap of the safety harness.

8. The cover of claim 7, wherein the top portion includes a flap portion extending upward from the first and second legs, the flap portion being configured and arranged to engage a connector interconnecting the energy absorber and the safety harness.

9. The cover of claim 7, wherein the fastener is configured to release to allow the energy absorber to operate when the energy absorber is subjected to a predetermined load.

10. The cover of claim 7, wherein the fastener is a hook and loop fastener.

11. The cover of claim 7, wherein the first and second straps each include ends with mating releasable fasteners.

12. A cover for an energy absorber stored in a single upside down V-shape folded configuration, the energy absorber including a first energy absorber portion and a second energy absorber portion configured and arranged to separate and absorb energy when subjected to a force from a fall, the cover comprising:
a top portion, the top portion including a first portion of a fastener assembly; a top including a second portion of the fastener assembly, the first portion is configured to engage with the second portion to connect and disconnect the top portion and the top, the top portion, the top and the fastener assembly being configured and arranged to couple the cover to a connector that interconnects the energy absorber to a safety harness;
a single first leg extending from the top portion, the single first leg having a first leg cavity configured and arranged to receive a first portion of the energy absorber;
a single second leg extending from the top portion in a divergent fashion relative to the single first leg, the single second leg having a second leg cavity configured and arranged to receive a second portion of the energy absorber, the single first leg and the single second leg form a single upside down V-shape, the first leg cavity and the second leg cavity assist in keeping the energy absorber in the single upside down V-shape folded configuration, the top portion and the top forming an opening to the first leg cavity and the second leg cavity;
a first connector member coupled proximate a distal end of the single first leg, the first connector member configured and arranged to couple the single first leg to a first strap of the safety harness; and
a second connector member coupled proximate a distal end of the single second leg, the second connector member configured and arranged to couple the single second leg to a second strap of the safety harness.

13. The cover of claim 12; wherein the cover is made from a front side and a rear side that are connected to form the first and second cavities.

14. The cover of claim 12, further comprising:
the top portion having a flap portion; and
the fastener assembly configured and arranged to couple the flap portion to the connector that interconnects the energy absorber to the safety harness.

15. The cover of claim 14, wherein the fastener assembly is configured to release to allow the energy absorber to operate when the energy absorber is subjected to a predetermined load.

* * * * *